Sept. 10, 1946.   J. G. OETZEL   2,407,510
BRAKE CONTROL
Filed Oct. 11, 1943   5 Sheets-Sheet 1
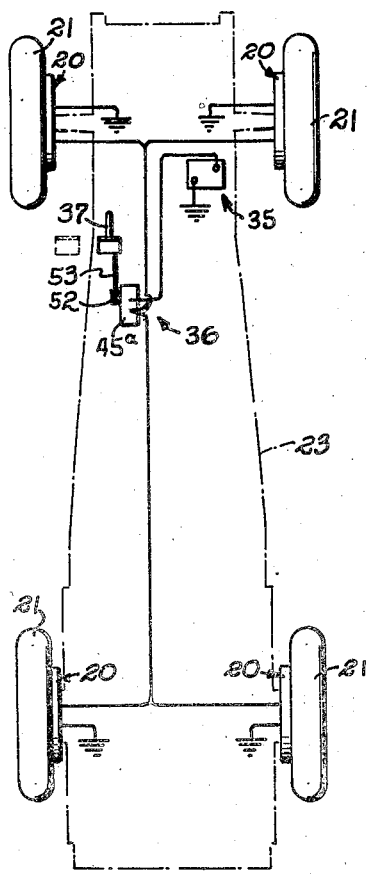
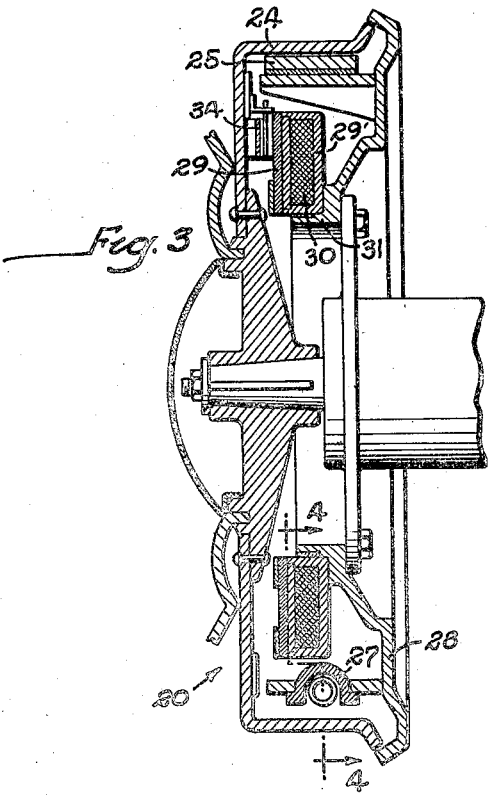
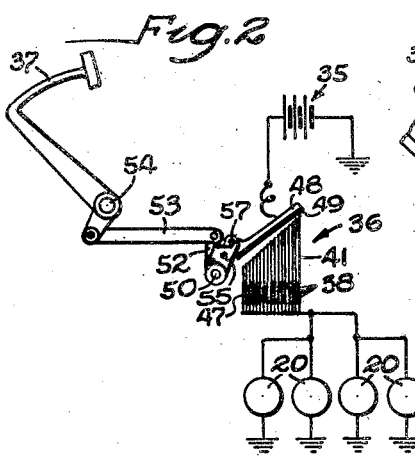
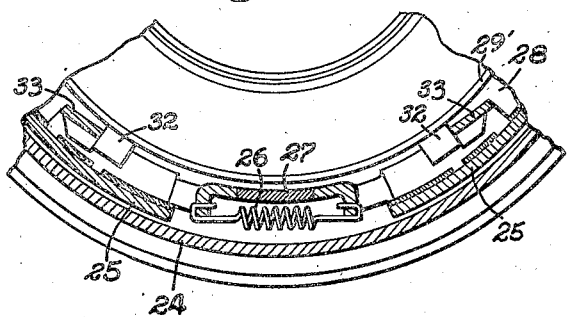
INVENTOR
John George Oetzel
By Parker, Carlson, Pitzner & Hubbard
ATTORNEYS INVENTOR
John George Oetzel
By Parker, Carlson, Pitzner & Hubbard
ATTORNEYS

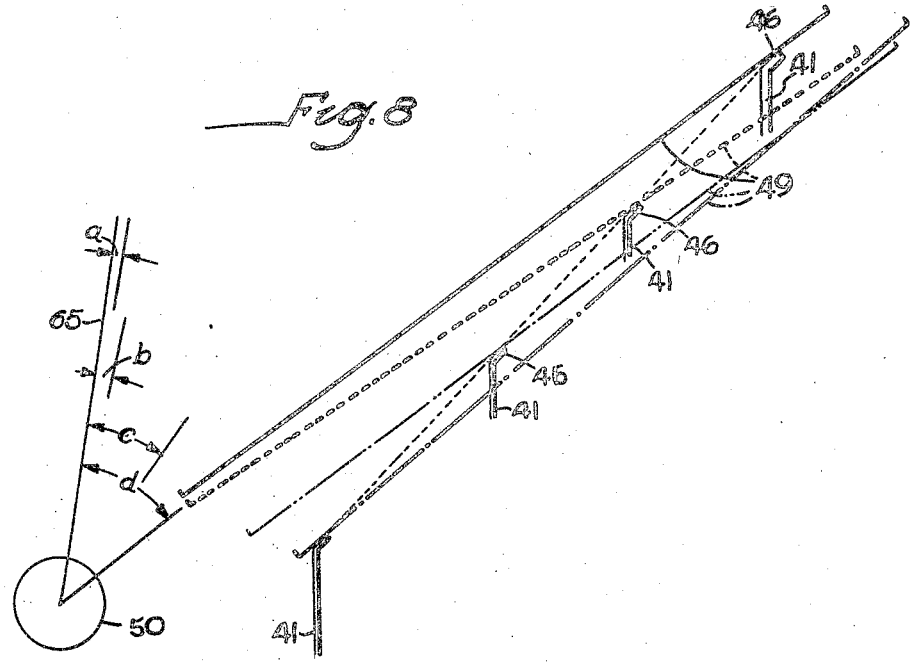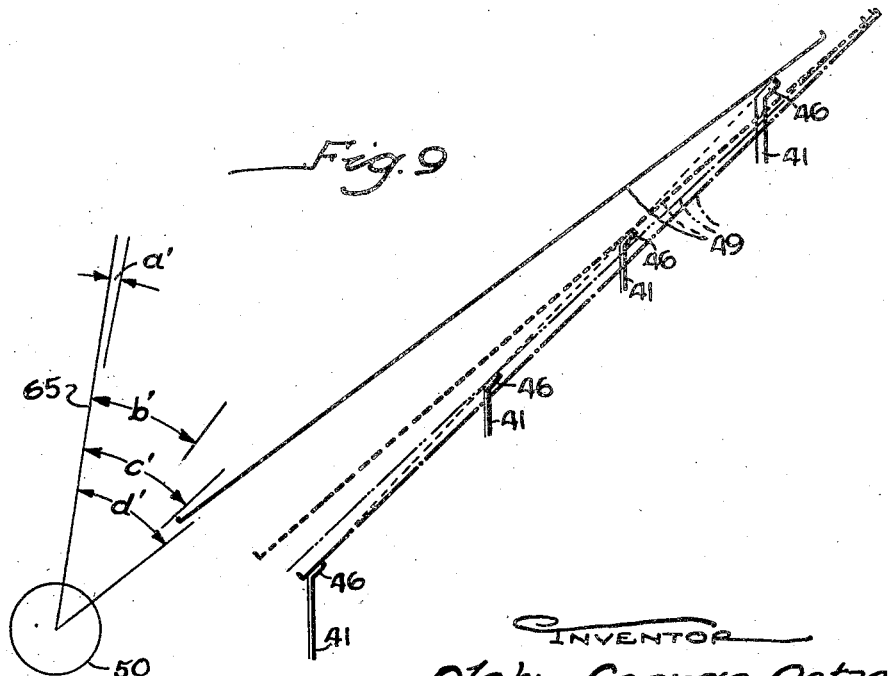

Patented Sept. 10, 1946

2,407,510

UNITED STATES PATENT OFFICE 2,407,510

BRAKE CONTROL

John George Oetzel, Beloit, Wis., assignor to Warner Electric Brake Manufacturing Company, South Beloit, Ill., a corporation of Illinois Application October 11, 1943, Serial No. 505,811

4 Claims. (Cl. 188—161)

This invention relates to the control of vehicle brakes and has to do more particularly with a control of the type in which the energization of the vehicle brakes is increased or decreased progressively in varying degrees in accordance with changes in the position of a foot or hand actuated controller.

In prior brake control systems of this type, particularly those for governing electric vehicle brakes, the change in the brake energization for a given increment of controller motion is substantially uniform throughout the control range. With such a linear characteristic, a skilled driver may safely regulate the deceleration of a loaded heavy duty vehicle on dry pavements. It is difficult, however, to graduate the braking action with the accuracy required for safe operation under the widely varying load, road and other conditions that are encountered in service, particularly when the brakes possess a substantial degree of wrapping or self-energizing action.

The primary object of the present invention is to provide a brake control which has a novel non-linear deceleration vs. controller movement characteristic which enables a heavy duty vehicle to be stopped or its motion checked with optimum safety under all conditions encountered in service.

A more specific object is to provide a brake control in which the increment of change in vehicle deceleration for a given movement of a manual actuator is substantially less in the initial part of the operating range than it is in the final or full braking part of the range.

Another object is to provide a novel control for an electromagnetic vehicle braking system which control compensates automatically for differences between the magnetization curves of the brake magnets when the energizing current is increasing and decreasing.

The invention also resides in the novel structural character of the means employed to carry out the foregoing objects.

Other objects and advantages of the invention will become apparent from the following detailed description taken in connection with the accompanying drawings, in which Figure 1 is a schematic plan view of a vehicle equipped with an electric braking system adapted to be controlled in accordance with the present invention.

Fig. 2 is a wiring diagram.

Fig. 3 is a diametrical sectional view of one of the vehicle brakes.

Fig. 4 is a fragmentary section taken along the line 4—4 of Fig. 3.

Figs. 8 and 9 are partial views illustrating different positions of the contact mechanism.

Figure 5:
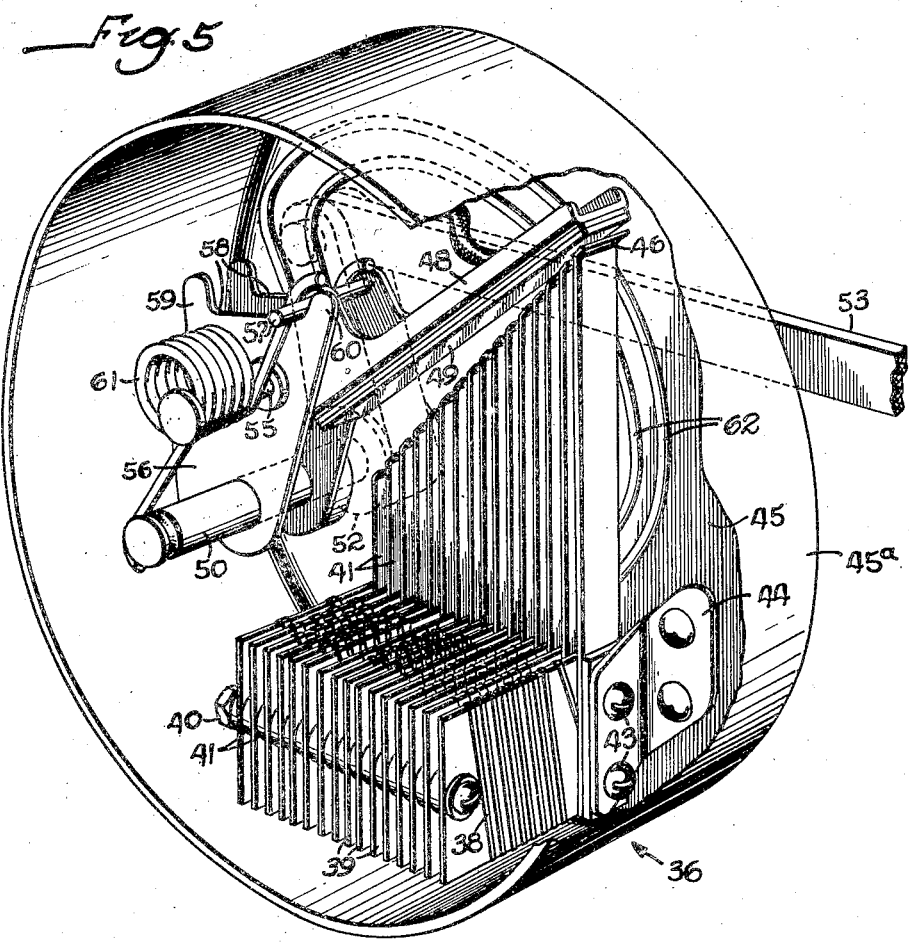
Fig. 5 is a fragmentary perspective view of the brake controller.
Figure 6:
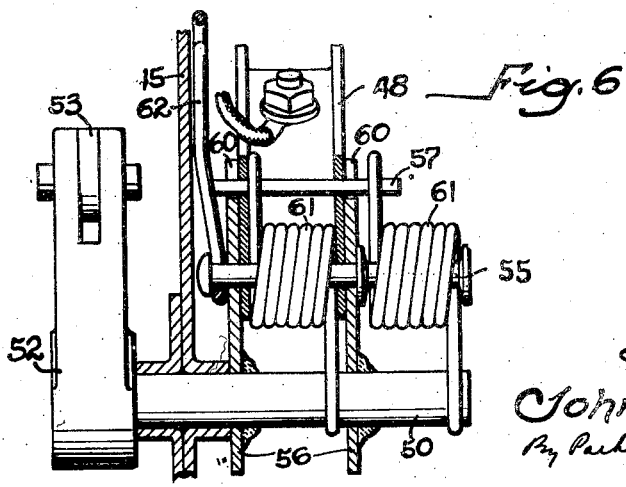
Fig. 6 is a fragmentary section taken along the line 6—6 of Fig. 5.

In the drawings, the invention is illustrated as applied to the control of the electromagnetic friction brakes 20 on the front and rear wheels 21 of an automotive vehicle such as a truck 23. The brakes may be of the electrical momentum type comprising a drum 24 rotatable with each wheel and a flexible friction band 25 extending around the inner drum surface with its adjacent ends terminating on opposite sides of and urged by a spring 26 toward a fixed stop 27. The latter is rigid with a non-rotatable anchor plate 28 secured to the steering knuckle or rear axle housing as the case may be.

Expansion of the band is effected by an electromagnetically controlled operator incorporated in the brake structure and capable of deriving an actuating force of varying magnitude from the momentum of the vehicle. Herein, the operator comprises a pair of magnetic friction elements in the form of rings 29 and 29' adapted for axial gripping engagement by energization of a winding 30 enclosed by the ring 29' which constitutes an electromagnet. This ring is mounted on a flange 31 for oscillation about the drum axis and has rigid therewith outwardly projecting lugs 32 disposed between brackets 33 on the adjacent ends of the band and adapted to move one or the other end of the band away from the stop 27 when the ring 29' is moved in either direction away from brake-released position in which it is normally maintained by the spring 26. The ring 29, which constitutes the magnet armature, rotates with the drum and is floatingly supported and urged into continuous mechanical contact with the friction face of the magnet by a plurality of tangentially extending metal strips 34.

Upon energization of the winding 30 with the vehicle in motion, the magnet face grips the moving armature and moves with it away from brake-released position (Fig. 4), thereby causing one lug 32 to move its band end and expand the band against the drum. When the band clearance has been taken up, slippage takes place at the gripping surfaces of the two rings, the ring 29' remaining stationary and maintaining the brake set with a force determined by the current flowing in the winding. Upon deenergization of this winding, the actuated end of the band and also the magnet ring 29' are spring restored to brake-released position.

Current for effecting simultaneous energization of the different wheel brakes may be derived from the usual storage battery 35 or other suitable source of supply on the vehicle, and the strength of such current may be regulated to govern the rate of vehicle deceleration by manipulation of a suitable voltage regulator such as a rheostat 36 as by depressing or releasing a foot pedal 37. Accordingly, one terminal of each brake winding 30 is grounded to the vehicle frame while the other winding terminals are connected to one terminal of the rheostat whose other terminal is connected by a conductor to the ungrounded battery terminal.

Preferably, the controller 36 is of the step type having a multiplicity of resistance elements 38 arranged to be connected successively into the brake circuit as the pedal 37 is depressed progressively from its released position. In the form shown, the elements comprise Nichrome wires wound on parallel insulating plates 39 separated by spacers 41a and electrically connected by a bolt 40 which constitutes the common rheostat terminal. Between the other ends of the plates are contact blades or leaf springs 41 which are separated by insulating spacers 42 and respectively clamped against the insulated ends of the respective wires 38 by bolts 43 which extend through brackets 44 by which the bank of resistance elements and blades are supported rigidly from the wall 45 of a suitable casing 45a. The blades project in spaced parallel relations laterally from the plates 39 and are of progressively increasing lengths so that their bent ends 46 lie substantially in a straight line when the blades are released. Herein there are seventeen blades and the sixteen longest ones are connected to the corresponding resistance elements 38. The shortest blade is connected directly to the terminal bolt 40 by a conductor 47 instead of a resistance wire.

The blades are made of resilient metal such as phosphor-bronze preferably about .020 of an inch thick, the two longest strips being of somewhat greater thickness, .040 of an inch in the present instance. The bent ends 46 constitute contacts which are engaged successively with a wiping action during the advance of a rigid flat contact 49 which constitutes the other rheostat terminal and is insulated from and mounted on an arm 48 so as to move broadwise toward the contact ends 46 as the arm is swung in one direction. Through a novel connection, the arm 48 is floatingly mounted and adapted to be actuated by turning of a shaft 50 journaled in a bearing 51 in the casing wall 45 and carrying on its outer end an arm 52 which is connected by a link 53 to an arm on the pedal supporting shaft 54.

The mounting for the arm 48 is such that in one direction of turning of the shaft 50, the contact 49 is carried from the released position shown in Fig. 5, toward and against the blade ends 46 first engaging the longest blade and then the successively shorter blades as the turning of the shaft continues. The mounting allows some degree of bodily floating movement so that during the return motion of the actuating shaft, each of the strip ends 46 is disengaged by the contact 49 at a position of the shaft closer to the brake-released position than the position of engagement in the advance of the shaft. Such action of the contact in engaging and disengaging the strip ends is obtained, in the present instance by pivoting the arm 48 on a pin 55 spaced from the actuating shaft 50 and also laterally from the contact plate 49 on the side thereof opposite from the contacts 46 and beyond the end that engages the shortest blade 41. The pivot pin is supported by two plates 56 fast on the shaft 50 which lie against opposite sides of the arm 48 so as to hold the latter against lateral displacement. Beyond the pivot 55, the arms 56 have a lost motion connection with the arm 48 which, for this purpose, carries a cross-pin 57 that rides along slots 58 formed in the arms 56 between stop lugs 59 and 60. Torsion springs 61 are coiled around the pin 55 and act between the shaft 50 and the pin 57 to urge the latter toward the lug 60 (Fig. 7).

Figure 7:
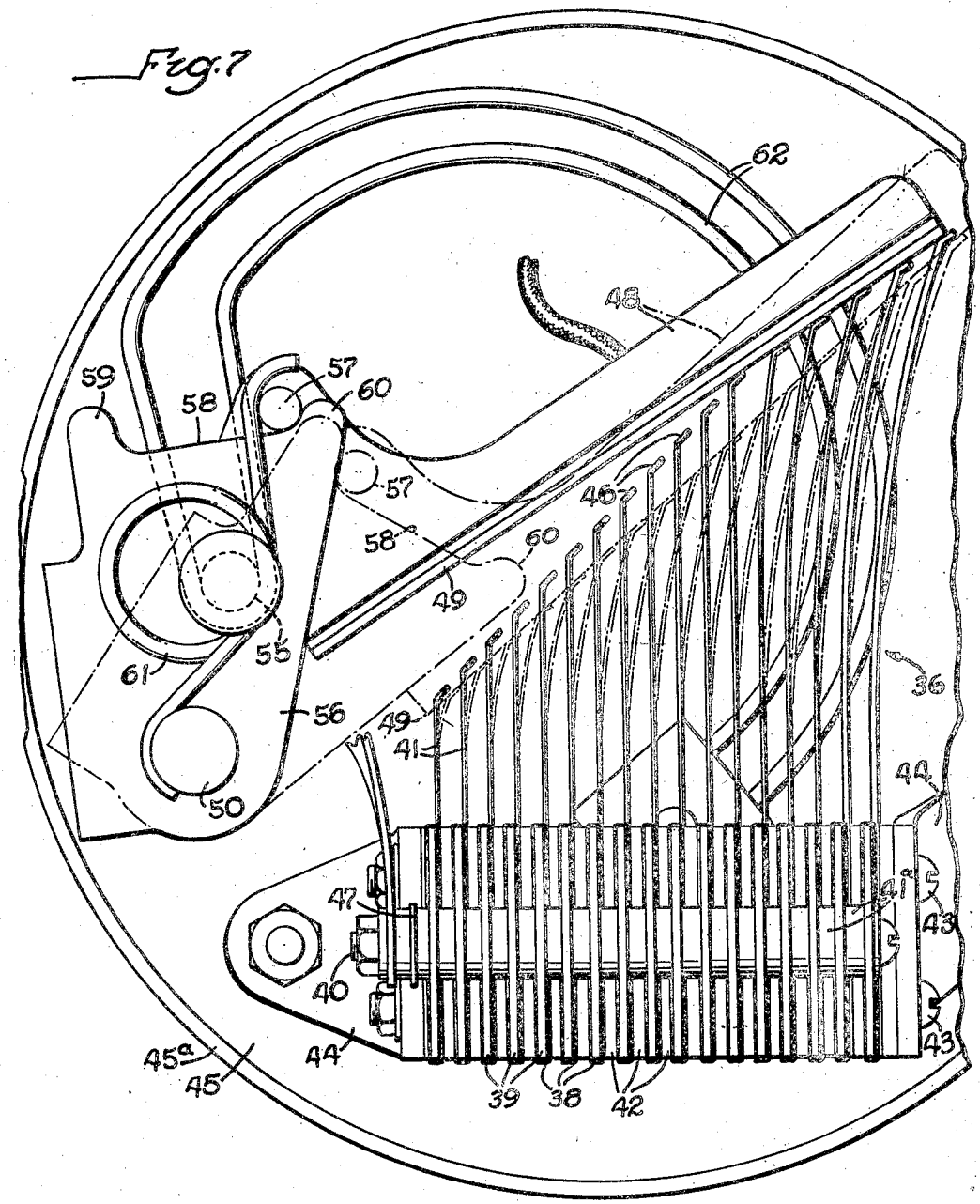
Fig. 7 is an enlarged elevational view of the controller-contact mechanism.

A return spring 62 anchored at one end on the casing wall 45 and acting at the other end on the pin 55 urges the shaft 50 and the parts thereon counterclockwise as viewed in Figs. 2, 5, and 7; so that when the pedal 37 is released to the limit position determined by engagement of a lug 59 with the peripheral wall of the casing 46a, the free end of the contact plate 49 will be spaced from but disposed adjacent to the end of the longest blade 41 and inclined away at a small angle from the ends of the successively shorter strips, being at the same time urged by the springs 61 to its limit clockwise position relative to the plates 56. Now, as the actuating shaft 50 is turned clockwise to energize the brakes, the longest blade 41 is engaged first and bends in the continued movement of the rigid contact 49 as the second and succeeding blades are engaged to interpose their respective resistance elements 38 in the circuit. The reactionary force of the initially engaged blades to continued advance of the contact increases until, after a number, five in this instance, of the blades have been picked up, the force of the springs 61 is overcome, and the arm 48 is allowed to swing counterclockwise relative to the arms 56. This movement, however, increases the force of the springs 61 so that the stress of the bent blades is overcome and the contact 49 is allowed to advance and engage the remaining successively shorter blades progressively. While the springs 61 are thus yielding, the contact 49 is shifted endwise and outwardly to some extent producing a desirable rubbing action between the engaged contact surfaces. Also, the effective line of action of the reactionary force applied by the engaged blades 41 shifts inwardly so that the actuating force applied to the contact 49 by the springs 61 causes the contact in effect to pivot about the ends of the longer blades as the shorter blades are being picked up. As a result, all of the engaged blades remain in firm contact with the plate 49 and the amount of the bending of the longer blades is minimized.

With the contact plate 49 mounted and actuated as above described, its advance to pick up the successive blade ends 46 involves turning on the pivot 55 and also some endwise shifting of the plate. Accordingly, the force applied to the plate must be sufficient not only to further bend the previously engaged blades 41, but also must overcome the friction at the pivot 55 and between the blade ends and the plate. On the return motion, however, these friction forces need not be overcome. In fact, they assist the bent blades in moving the plate 49 backwardly as permitted by retraction of the actuating shaft 50. As a result, the contact plate assumes different positions relative to the actuating shaft than during the advancing movement of the plate. That is to say, the plate will, during its return movement, disengage any one of the blade ends 46 in a position of the shaft 50 advanced from the position at which the same blade was engaged during depression of the pedal 37. In other words, the positions of the shaft 50 at which any strip end is first engaged by the contact 49 will be angularly spaced from the brake-released position 65 (Figs. 8 and 9) a shorter distance than when the same blade end is disengaged on the return movement of the shaft.

As shown in Fig. 8, the end 46 of the longest blade 41 is engaged after clockwise turning of the shaft through an angle $a$ and advance of the contact face 49 to the full line position. Then, in the continued advance of the shaft through the angle $b$ and movement of the contact face to the dotted position, the fifth blade is engaged and the springs 61 start to yield before the sixth blade is picked up as shown in full lines in Fig. 7. When the shaft has turned through the angle $c$, the eleventh blade is engaged as shown by the double dot-dash position of the contact 49. Finally, after the shaft has advanced through an angle $d$, the contact face, as shown in dot-dash outline (Fig. 8), engages the last or shortest blade and all of the blade ends are bent as shown in phantom in Fig. 7. During the return movement, however, different angular positions, as shown in Fig. 9, are assumed by the contact face, and the last, the eleventh, the fifth and the first blades are disengaged successively with the shaft 50 spaced at angles $d'$, $c'$, $b'$ and $a'$ from the released position 65.

Figure 11:
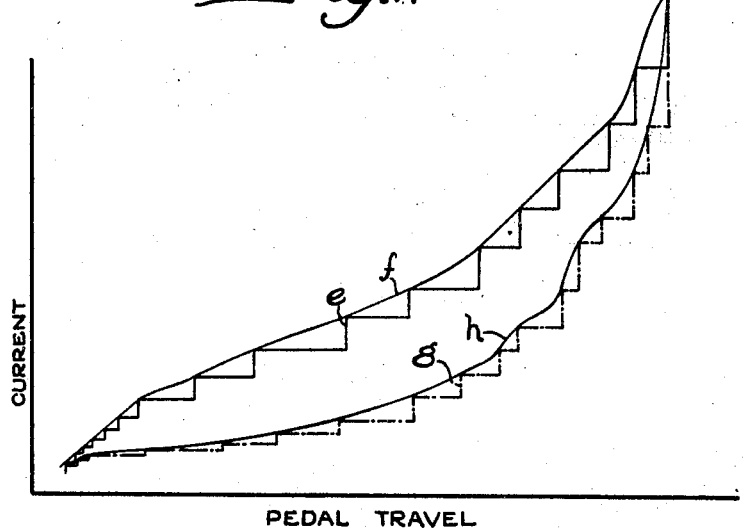
Fig. 11 shows current vs. controller movement curves.

The result of the differential action above described in engaging and disengaging the blades results in a different pedal movement vs. current characteristics during the advance and return motions. Thus, the current applied to the brake windings 30 while the pedal is being depressed may vary with the pedal movement as shown by the stepped curve $e$ (Fig. 11) and the resulting flux created in the brake magnets to produce a proportional deceleration will follow the current changes but will lag the latter. On the return movement, however, the current will change along the curve $g$, and the flux produced will lag the current changes. Because of the differential contact action above described, the current curve $g$ is disposed below the curve $e$. Such variation of the current is advantageous in order to compensate for the hysteresis behavior of the brake magnets which results in a greater flux being created in the brake magnets for a given energizing current when the current is decreasing than when the magnet current is being increased. Such greater increase in magnet energization while the current is being increased may substantially offset the hysteresis loss with the result that the flux characteristics while the current is being increased and decreased respectively, are brought closer together, and the total flux and therefore the deceleration produced by each brake is more nearly the same value irrespective of whether the pedal is being depressed or released. This characteristic contributes in a substantial way to the greater accuracy with which the brakes may be controlled.

In order to obtain optimum safety in controlling the deceleration of the vehicle under all conditions, the contact mechanism of the controller and the values of the resistance elements 38 are constructed and arranged to produce a non-linear vehicle deceleration vs. actuator movement curve and more particularly a curve such as indicated at $k$ (Fig. 10) whose slope increases at successive points along the major portion of the deceleration increasing movement of the control pedal. Such a non-linear characteristic is to be contrasted with a linear characteristic as shown by the curve $l$ wherein the deceleration, for a given vehicle load, changes substantially equal amounts for the same increment of pedal movement in different parts of the operating range.

While such a non-linear characteristic curve may take various forms, it is preferred to provide for progressive variation of the slope particularly in the lower part of the range in which the control is operated under difficult driving conditions as with the vehicle lightly loaded and on a slippery pavement. A curve of this character is obtained in the present instance, by spacing blades 41 above described substantially uniformly and by proportioning the values of the resistance elements 38 so as to produce a substantially smaller increment of current change for a given pedal movement in the lower portion of the range than in the latter portion.

With four vehicle brakes connected in parallel in a six volt circuit as above described and having, together with the circuit, a total resistance of .50 of an ohm, a current vs. pedal movement curve $e$ (Fig. 11) may be obtained with the sixteen elements 38 successively interposed in the circuit constructed to have resistances of 7.38, 21.7, 23.3, 24.9, 21.7, 11.43, 7.94, 6.32, 4.52, 3.36, 2.59, 1.62, 1.304, 0.704, 0.468, and 0.115 ohms respectively. From the curve $e$, it will be observed that in the lowermost part of the operating range during which the first few blades 41 are picked up, the energization curve is essentially a straight line, this being due largely to the action of the contact plate 49 when mounted as above described. Linearity over this small zone is advantageous in providing for wider separation of the two curves $e$ and $g$ and not objectionable inasmuch as the vehicle deceleration will not be excessive even under adverse operating conditions. Over the remainder of the curve $e$, however, the slope increases progressively as emphasized by the continuous curve $f$, changing very gradually in the lower part which includes the critical driving range where very accurate regulation is necessary to enable the vehicle driver to negotiate slippery roads with an empty vehicle. Within this zone, where the slope is actually substantially less than in the initial straight portion of the curve, a substantial pedal movement is required in order to effect a change from one step to the next in the brake energizing current and, in addition, the current changes for the successive steps are smaller than in the final part of the range. As a result, the control of the brakes is more sensitive and the operator is better able to sense the reaction of the moving vehicle to the pedal movement and thereby graduate the deceleration accurately in accordance with existing load and road conditions. This is particularly true in the present instance wherein the slope of the current decreasing curve $g$ is, due to the differential action of the contact mechanism as above described, considerably less over the lower part of the operating range. This is emphasized by the continuous curve h. That is to say, an even greater pedal movement is required to change the current one step, giving increased accuracy of control. This is a desirable characteristic owing to the natural procedure followed by a driver in checking the motion of a heavy duty vehicle. This procedure involves applying the most severe braking, commensurate with the load and road conditions, at the maximum vehicle speed and then retracting the pedal and adjusting it intermittently for lesser and lesser braking as the vehicle comes to a stop. Considering the very gradual slopes of the curves e and g and the differences in their slopes in the lower portion of the operating range, it will be apparent that the present control is admirably adapted to natural procedure of braking a vehicle and gives the fine control that is required in the critical part of the operating range where the ability to graduate the deceleration extremely accurately is essential in order to achieve safety of operation under all of the widely varying operating conditions that may be encountered.

Figure 10:
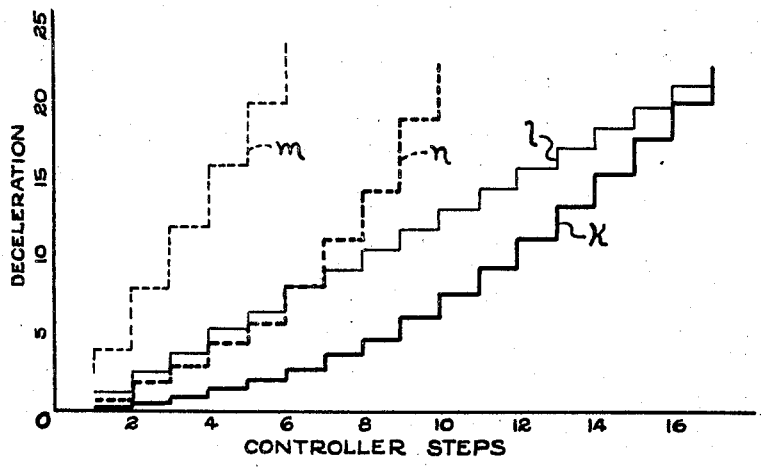
Fig. 10 shows deceleration vs. controller movement curves.

The advantage of the non-linear characteristic in contributing to safe operation will be more apparent by a comparison of the deceleration curves shown in Fig. 10, and together with an appreciation that the gross weight of a modern heavy duty vehicle when empty is only one third of the weight when loaded. If the characteristic of the brake control system is made substantially linear as has been the practice heretofore, the deceleration curve when the vehicle is loaded would be shaped somewhat as indicated at l. With such a characteristic, the sensitivity of the control is no greater in the lower or critical portion of the range than it is in the higher part where accuracy of control is not of such importance. This objection is magnified to even a greater degree when the vehicle is operating empty as indicated by the curve m. Here the slope is greater which means that a greater change in deceleration is produced for each step with the result that the driver's ability to graduate the braking accurately is reduced correspondingly.

The foregoing objections are largely overcome by employing a non-linear characteristic as contemplated by the present invention. Thus, as shown by the curve k, the deceleration, when the vehicle is loaded, increases in comparatively small increments in the lower and critical part of the range, although each increment of change in the upper part of the curve is increased. Thus, the control is much more sensitive in the critical zone and the decreased sensitivity in the final or severe braking part of the range is not detrimental since severe brake applications are applied infrequently and suddenly and it is not ordinarily important that they be graduated accurately. The same characteristics prevail when the vehicle is empty as illustrated by the curve n, it being even more important under such conditions that the brakes be controllable accurately in the lower part of the range.

The greater sensitivity to pedal movement in the critical part of the brake operating range as achieved by the present invention is particularly advantageous in systems having brakes which, as in those above described, possess a substantial degree of wrapping or self-energizing action which, since it depends on friction, is a variable factor detracting from the controllability. With such brakes, accuracy of control of the brake actuating force is all the more important.

The construction of the controller above described may be altered readily to change the slope of the characteristic curve. For example, by reducing the thickness of the first two blades 41, the current curve may be flattened somewhat. Also, by making suitable alterations or changes in the values of the resistances 38, the slope of the curve e over the first few steps may, if desired, be made more gradual.

I claim as my invention:

1. A system for controlling the energization of electromagnetically controlled brakes on a vehicle comprising means providing an energizing circuit for said brakes including a source of electric current and a voltage changer having a member movable away from and back toward a brake-released position to respectively increase and decrease the energization of said brakes progressively, a manually operable actuating element, and mechanism actuated by said element and actuating said member differentially to produce greater energization of said brakes at a given position of said element in moving away from said released position than during the return movement of the element.

2. A system for controlling the energization of electromagnetically controlled brakes on a vehicle comprising means providing an energizing circuit for said brakes including a source of electric current and a voltage regulator, a manually operable actuating element movable away from and back to a normal brake-released position, and mechanism actuated by said element and operating said regulator differentially to produce a different element movement vs. current characteristics during movement of the element away from and back toward said released position, the current increasing curve being disposed above the current decreasing curve.

3. A system for controlling the energization of vehicle brakes each controlled by an electromagnet, comprising means providing an energizing circuit for the magnets of said brakes including a source of electric current and a single voltage regulator, a manually operable actuating element movable away from and back to a normal brake-released position, and mechanism actuated by said element and operating said regulator to cause greater energization of said magnets in a given position of said element when the latter is moving away from said released position than when the element is moving toward such position whereby to compensate for hysteresis in said magnets.

4. A system for controlling the energization of electromagnetically controlled vehicle brakes having an energizing circuit comprising a voltage changer having a member movable away from and back toward a brake-released position to respectively increase and decrease the energization of the brake circuit progressively, a manually operable actuating element, and mechanism interposed between said element and said actuating member and acting differentially in the movement of said element to position said member a greater distance from said brake-released position for a given position of said element as the latter moves away from brake-released position than for the same position of the element when the latter is moving reversely.

JOHN GEORGE OETZEL.